May 4, 1937.

L. A. UMANSKY

Re. 20,353

MOTOR CONTROL SYSTEM

Original Filed Oct. 11, 1933 2 Sheets-Sheet 1

Inventor:
Leonid A. Umansky,
by Harry E. Dunham
His Attorney.

Reissued May 4, 1937 Re. 20,353

UNITED STATES PATENT OFFICE 20,353

MOTOR CONTROL SYSTEM

Leonid A. Umansky, Schenectady, N. Y., assignor to General Electric Company, a corporation of New York Original No. 2,021,757, dated November 19, 1935, Serial No. 693,138, October 11, 1933. Application for reissue December 8, 1936, Serial No. 114,786

25 Claims. (Cl. 242—75)

This invention relates to control systems, more particularly to systems in which an object is controlled in accordance with the rate of change of speed of a controlling element, and it has for an object the provision of a simple, reliable and improved system of this character.

More specifically the invention relates to control systems for electric motors, and a more specific object is the provision of means for controlling the input to the controlled motor in accordance with the rate of change of speed of a control element.

In another of its aspects, the invention relates to motor control systems for apparatus having a motor driven element operating on a strip of material and a motor driven reel for supplying the strip to the operating element or taking up the strip delivered by the operating element, and a further object of the invention is the provision of means for maintaining a substantially constant tension in the strip between the operating element and the reel during acceleration and deceleration of the driving motors as well as when the motors are operating at constant speed.

In carrying the invention into effect in one form thereof, the energization of a dynamo-electric machine is varied in accordance with the speed of a variable speed controlling element and this machine is provided with a substantial amount of fly-wheel effect so that its current varies in accordance with the rate of change of speed of the controlling element and this variable current is utilized to exert a controlling action on the device or object which it is desired to control.

As applied to the control of motors for driving an element operating on a strip of material and the supply or take-up reels, a regulator is provided for maintaining substantially constant current input to the reel motor while operating at constant speed, and means responsive to the rate of change of speed of the element driving motor are provided for varying the setting of the regulator in proportion to the rate of change of speed of the element driving motor. In one embodiment the rate of change of speed responsive means for varying the regulator setting takes the form of an additional coil on the regulator for modifying the action of the regular operating coil, together with a dynamo-electric machine connected in circuit with the additional regulator coil, supplied with a voltage varying with the speed of the operating element, and designed with substantial fly-wheel effect so that it draws a current varying with the rate of change of speed of the element driving motor to vary the setting of the regulator.

Figure 1:
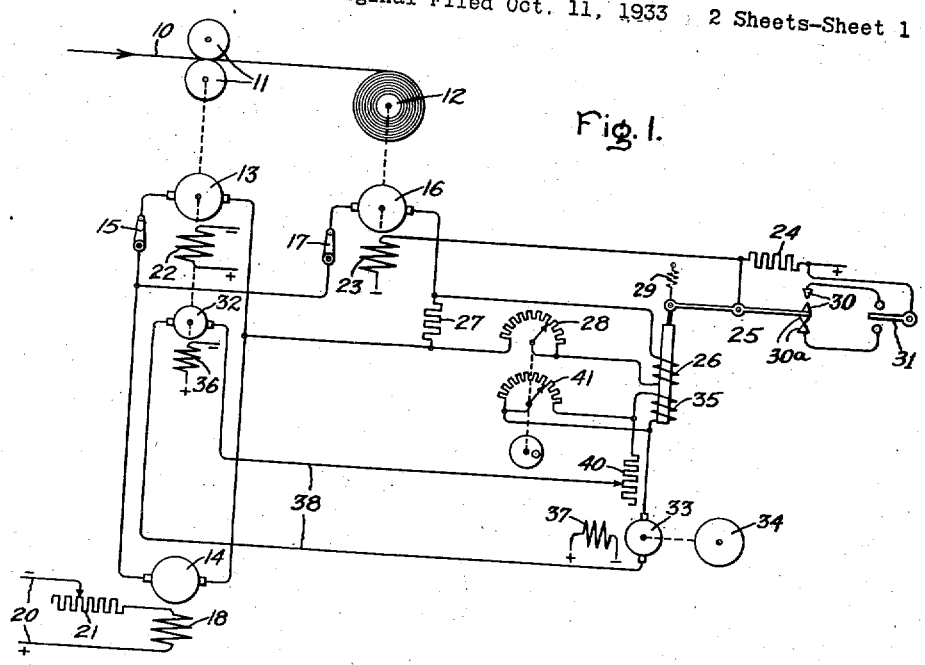
Figure 2:
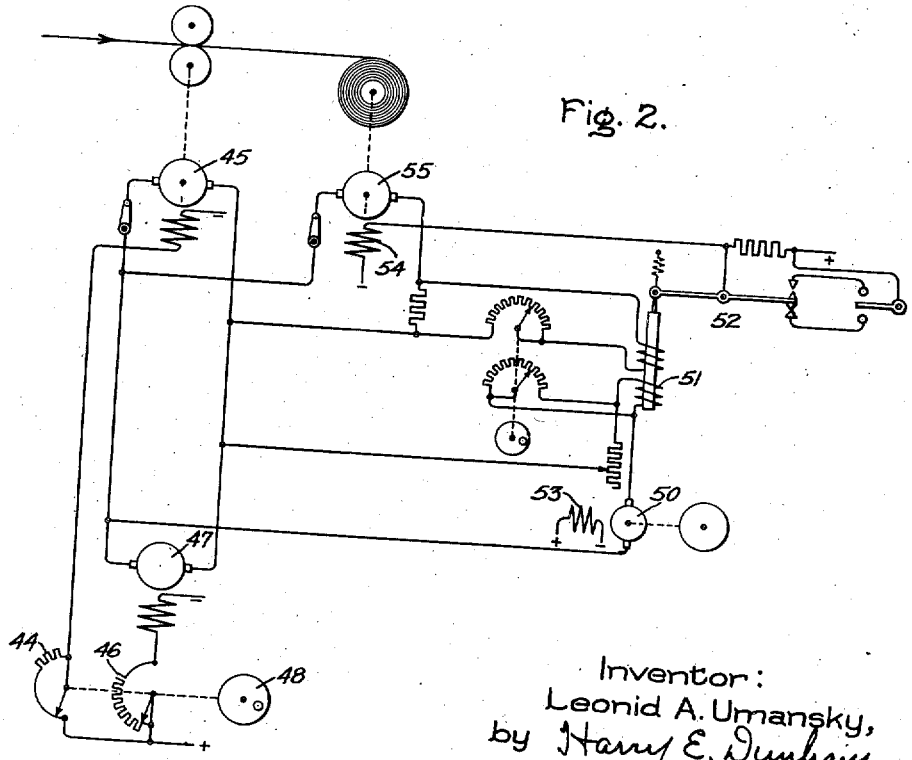
Figure 1:
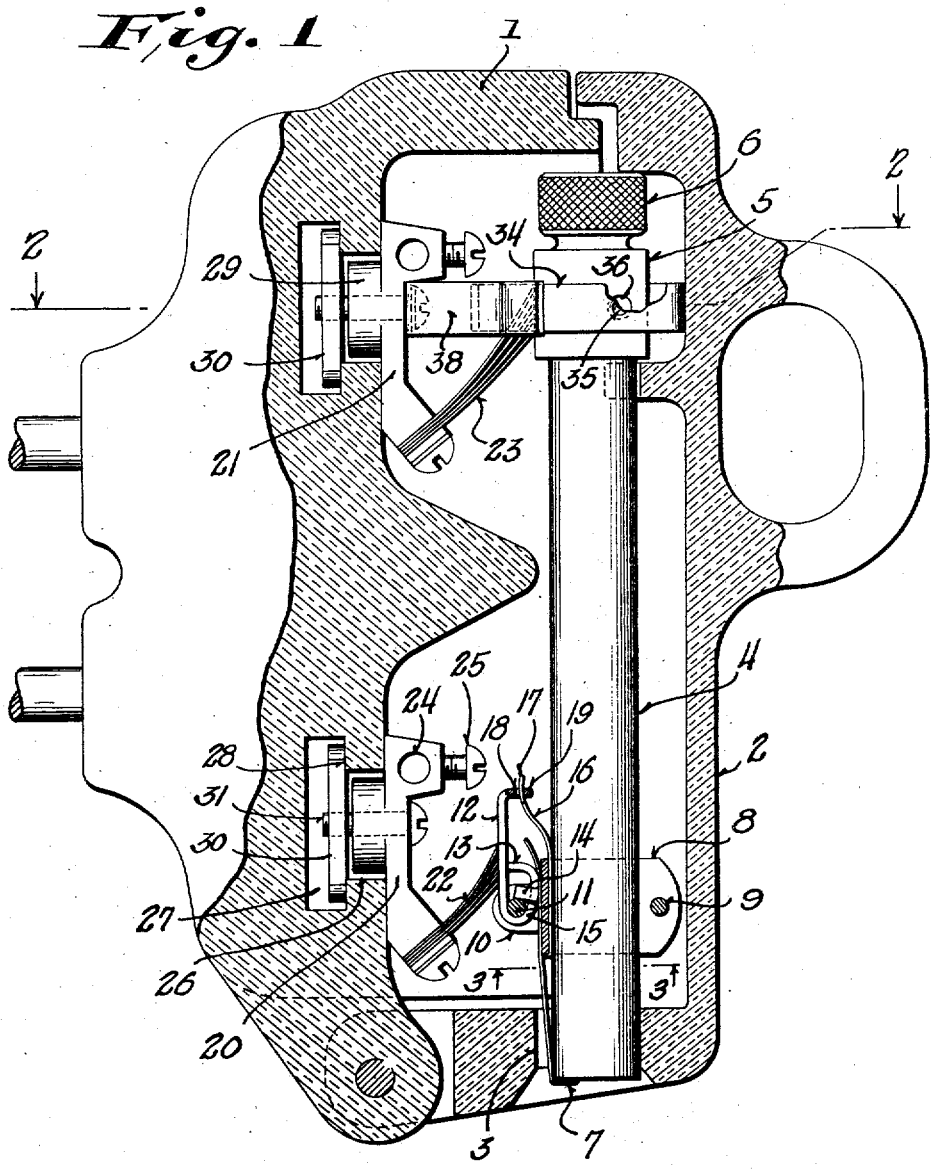

In illustrating the invention in one form thereof it is shown as embodied in a motor control system for the mill and take-up reel motors of a cold strip steel rolling mill. For a better and more complete understanding of the invention reference should now be had to the following specification and to the accompanying drawings in which Fig. 1 is a simple, diagrammatical representation of an embodiment of the invention and Figs. 2 and 3 are simple diagrammatic representations of modifications thereof.

Referring now to the drawings, a strip of material 10 such for example as cold steel is being fed in the direction of the arrow to a pair of reducing rolls 11 between which the gauge of the strip is suitably reduced and the strip emerging from the rolls is wound upon a take-up reel 12. The rolls 11 are driven by any suitable driving means illustrated in the drawings as an electric motor 13 of the direct current type which in turn is supplied from any suitable source such as that represented by the variable voltage generator 14, with the armature of which the armature of the motor 13 is connected in a loop circuit when the switch 15 is in its closed position. Similarly the reel 12 is driven by a direct current driving motor 16 which may be supplied from any suitable source but which is preferably supplied from the mill motor supply generator 14, when the switch 17 is in its closed position. Both motors 13 and 16 are shown as direct connected to the machine elements which they drive but in practice a gear drive is usually employed.

The supply generator 14 is driven at a speed which is preferably substantially constant by any suitable driving means (not shown) such for example as a synchronous motor or an alternating current induction motor. As shown, the generator 14 is provided with a field winding 18 supplied from a suitable constant potential source represented by the plus and minus supply lines 20 and its excitation is adjusted by means of a suitable rheostat 21 included in circuit therewith. As is well understood, operation of the rheostat 21 to vary the excitation of the field 18 produces a corresponding variation in the voltage of the generator 14 and the speed of the driving motors 13 and 16 supplied therefrom. The connection of a driving motor in a loop circuit with a variable voltage generator, such as shown in the drawings, is usually referred to in the art as a Ward-Leonard connection and it has the advantage that the speed of the motor can be smoothly included in the circuit of the fly-wheel motor and the auxiliary coil 35 for making minor adjustments without changing the fly-wheel.

For different settings of the regulator setting rheostat 28, the same amount of accelerating current in the armature of the reel motor will vary the effect of the regulator operating coil 26 and thus it becomes necessary to change the effect of the auxiliary coil 35 in proportion. For this purpose a rheostat 41 is provided which shunts a larger or smaller proportion of the current drawn by the fly-wheel motor 33. As shown, this rheostat is mechanically coupled to the regulator setting rheostat 28 and is operated by a common hand wheel so that it varies the effect of the auxiliary coil 35 in proportion to the amount the regulator setting rheostat 28 varies the effect of the coil 26 during acceleration and deceleration of the reel.

The operation of the system is as follows:

Assuming that the supply generator 14 is being driven at its proper speed, the mill motor 13 and the reel motor 16 are started from rest by operating the rheostat 21 to decrease the resistance in the field circuit of the supply generator and thus to increase the generator voltage. For the pass in which the motor 16 driving the reel to wind the delivered strip, the movable contact of switch 31 is moved to engage its upper stationary contact, thereby rendering the regulator contacts 30 active so that the regulator responds to regulate the motoring action. For any given mill speed, the fly-wheel motor 33 operates at a corresponding speed and draws an almost insignificant current from the tachometer generator 32.

As long as the mill speed remains constant, the regulator 25 functions in the previously described manner to maintain substantially constant current input to the reel motor 16 by increasing the excitation of the reel motor to decrease the speed thereof as the diameter of the coil on the reel 12 increases. Thus, for any mill speed the regulator 25 maintains substantially constant tension in the strip between the reel and the mill rolls.

If now the speed of the mill is increased the voltage of the pilot generator 32 will increase in proportion, and the fly-wheel motor 33, tending to follow the speed of the pilot generator 32 will draw an increased current in order to accelerate its armature and the fly-wheel 34. This current is approximately proportional to the rate of change of speed of the pilot generator 32 and is thus approximately proportional to the rate of change of speed of the mill motor 13 which in the illustrated system serves as the variable speed controlling element. Thus the value of the current drawn by the fly-wheel motor serves as a measure of the rate of change of speed of the mill. Since this current flows through the auxiliary coil 35 which at this time is acting differentially with respect to the operating coil 26, the effect is automatically to increase the "setting" of the regulator without tampering with its operating coil 26 or its circuit. The greater the acceleration of the mill, the greater will be the bucking action of the auxiliary coil 35 and thus the higher will be setting of the regulator. In other words, the increased current flowing in the auxiliary coil 35 decreases the effect of the operating coil 26 and this allows the reel motor 16 to draw the increased current that is necessary in order to accelerate its own armature and the mass of the reel without decreasing or losing the tension in the strip between the reel and the mill rolls. Thus, it will be seen that the setting of the regulator is automatically and properly adjusted to allow the reel motor to draw the current required for acceleration. As the fly-wheel motor comes up to speed, the acceleration gradually decreases and thus the regulator 25 gradually returns to its original setting.

When the mill is decelerated by decreasing the voltage of the supply generator 14, the direction of the current flowing in the circuit of the fly-wheel motor and the auxiliary coil 35 will reverse. This is due to the fact that the fly-wheel is an energy storage device and gives up its stored energy in the form of electric current when the voltage of the pilot generator is decreased below the value of the counter voltage of the fly-wheel motor 33. As a result the effect of the auxiliary coil 35 and the operating coil becomes cumulative thereby decreasing the effective setting of the regulator, which condition is exactly what is required for decelerating the reel motor so as not to rupture the strip or unduly increase its tension.

It will thus be seen that substantially constant tension is maintained in the strip between the mill rolls and the reel not only during constant speed operation of the mill but during periods of acceleration and deceleration as well.

In the above description it has been assumed that the reel 12 is operating as a take-up reel. However, if the mill is a reversing type mill, during the succeeding pass, the reel operates as a supply reel, and the motor 16 operates as a drag generator driven by the strip, returning energy to the system and maintaining back tension in the strip between the reel and the mill. For this operation, the movable contact of the switch 31 is moved into engagement with its stationary contact thereby rendering the back contacts $30_a$ of the regulator active to control the resistance 24. The result of this change is to cause the regulator to respond to "generating" action. In this connection it is to be noted that when the contacts 30 are active an increase in the armature current causes the contacts 30 to short-circuit the resistance 24 and thereby strengthen the field. This is the correct regulating action if the regulated machine is operating as a motor. If the contacts $30_a$ are active, an increase in the armature current causes the contacts $30_a$ to open, insert the resistance 24 in the field circuit and thereby weaken the field, which is the correct regulating action if the regulated machine is operating as a generator. The operation of the fly-wheel dynamo-electric machine 33 under this condition is similar, but the reverse of that just described for the preceding pass. Thus the terms "take-up reel" and "motor" are to be understood as employed in a descriptive and not in a limiting sense.

The arrangement shown in the modification of Fig. 2 is in most respects identical with the system of Fig. 1. However, in this modification a variable rheostat 44 is included in the field circuit of the mill motor 45 so that the mill speed is controlled not only by the generator voltage, but also by weakening the field of the mill motor. As shown, the motor field rheostat 44 is mechanically connected to the rheostat 46 in the field circuit of the supply generator 47. The two rheostats are operated by a common hand-wheel 48. The resistance sections and movable contacts of these rheostats are so arranged that the speed of the mill motor is not increased by field weakening until after the generator has been brought to full voltage.

In this modification the fly-wheel motor 50 is not supplied from a pilot generator as in the system of Fig. 1 but on the other hand is connected directly across the mains of the supply generator 47. The armature of the fly-wheel motor is connected in the circuit of the auxiliary coil 51 of the regulator 52 which is in all respects identical with the regulator 25 of Fig. 1. The separately excited field winding 53 of the fly-wheel motor 50 and the field winding 54 of the reel motor 55 are connected to suitable constant potential sources indicated by plus and minus signs as in the system of Fig. 1.

There is a definite advantage in connecting the armature of the fly-wheel motor 50 across the terminals of the supply generator instead of energizing it from a separate pilot generator as in the system of Fig. 1. It is obvious that the generator voltage increases before the mill speed can follow the increase of voltage. Therefore, the regulator forcing coil 51 will be energized slightly earlier than would be the case if the fly-wheel motor were connected to a pilot machine. This "anticipating" action is especially advantageous when starting up from rest.

After the mill and reel have been accelerated by raising the generator voltage, the rolling speed may be further increased by weakening the field of the mill motor 45. Obviously, any suitable means, such for example as a rheostat similar to the rheostat 44 and actuated by the handwheel 48 may be utilized to weaken the field of the fly-wheel motor 53 simultaneously with the weakening of the field of the mill motor. This will cause the fly-wheel machine to draw a suitable accelerating current from the generator mains; this current, flowing through the forcing coil 51 will suitably increase the setting of the regulator and will permit the reel motor to maintain the strip tension substantially constant even during this part of the accelerating period.

The operation of the modified system of Fig. 2 is otherwise substantially identical with the previously described operation for the system of Fig. 1 and repetition is unnecessary.

In the modified system shown in Fig. 3 the fly-wheel motor 60 is supplied from a pilot generator 61 driven by the mill motor 62 as in the system of Fig. 1. The regulator 63 is in all respects identical with the regulator 25 in Fig. 1. The modified system of Fig. 3 is different from the system of Fig. 1 in that the armature of a booster generator 64 is included in the armature circuit of the reel motor 65 between the armature terminals of the latter and the mains of the supply generator 66. The booster generator 64 is driven at a speed which is preferably substantially constant by any suitable driving means illustrated as an alternating current motor 67 supplied from a suitable source indicated by the three supply lines 68. Either a synchronous motor or an induction motor may be utilized to drive the generator 64. As shown, the field winding 70 of the booster generator is included in the circuit of the armature of the fly-wheel motor 60 and the auxiliary regulator coil.

In operation, when the mill is operating at substantially constant speed, the running light current of the fly-wheel motor 60 is practically negligible, with the result that the excitation and generated voltage of the booster generator 64 are practically nil. As the speed of the mill is increased by increasing the voltage of the supply generator 66, the fly-wheel motor 60 draws a current proportional to the rate of change of speed of the mill. This increased current flowing through the field winding 70 of the booster generator will cause the latter to generate and introduce an additional voltage in the armature circuit of the reel motor 65. This additional voltage introduced in the armature circuit of the reel motor will cause the latter to accelerate without any tendency to diminish the strip tension. It is also evident that the polarity of the booster generator is automatically reversed so that it becomes a bucking generator during deceleration and assists the reel motor to decelerate properly without any tendency to increase the tension.

In other words, in the arrangement shown in Fig. 3, the additional input to the reel motor, required during the accelerating period, is obtained either wholly or partly by temporarily increasing the applied voltage, instead of obtaining this additional input entirely by increasing the armature current as in Figs. 1 and 2. In an extreme case, a properly designed booster generator 64, may fully take care of maintaining tension during acceleration and retardation, dispensing entirely with the forcing coil on the regulator 63. The remainder of the arrangement and its operation is in all respects identical with that of Fig. 1 and will not be repeated.

In accordance with the provisions of the patent statutes this invention is described as embodied in concrete form but it will be understood that the apparatus, elements, and connections shown and described are merely illustrative and that the invention is not limited thereto since alterations and modifications will readily suggest themselves to persons skilled in the art without departing from the true spirit of this invention and the scope of the annexed claims.

What I claim as new and desire to secure by Letters Patent of the United States, is:

1. In combination, a variable speed element, means for supplying a voltage varying with the speed of said element, a dynamo-electric machine connected to said supply-means and provided with substantial fly-wheel effect so that its current varies with the rate of change of speed of said element.

2. In a control system a variable speed element, control means, and means for actuating said control means comprising a dynamo-electric machine provided with substantial fly-wheel effect and means for supplying a voltage varying with the speed of said element to said machine so that its current varies with the rate of change of speed of said element.

3. A control system comprising a variable speed element, a controlled object, a control device for said object, and means for actuating said device comprising a dynamo-electric machine provided with substantial fly-wheel effect and means for supplying a voltage varying with the speed of said element to said machine so that its current varies with the rate of change of speed of said element.

4. A control system comprising a variable speed element, a source of supply connected with said element, a dynamo-electric machine supplied from said source and provided with substantial fly-wheel effect so that its current varies with the rate of change of speed of said element, and a control device responsive to said current 5. A control system comprising a variable speed element, means for producing a voltage substantially proportional to the speed of said element, and a dynamo-electric machine energized from said voltage producing means and provided with substantial fly-wheel effect so that its current varies with the rate of change of speed of said element.

6. A control system comprising a variable speed element, an electric motor, a pilot generator driven by said element, a dynamo-electric machine supplied from said generator and provided with substantial fly-wheel effect so that its current varies with the rate of change of speed of said element, and means responsive to said current for controlling said motor.

7. A control system for an electric motor comprising a variable speed element, a regulator for maintaining an operating characteristic of said motor substantially constant, means for producing a voltage varying with the speed of said element and a dynamo-electric machine energized from said voltage producing means and provided with substantial fly-wheel effect so that its current varies with the rate of change of speed of said element, and means responsive to said current for controlling the action of said regulator.

8. A control system comprising a dynamo-electric machine, supply means for said machine, a booster generator connected in circuit with said machine and said supply means, a variable voltage supply source and a dynamo-electric machine supplied from said source and provided with substantial fly-wheel effect for controlling said generator.

9. A motor control system comprising an electric motor, a source of supply therefor, a booster generator connected in circuit with said motor and a dynamo-electric machine provided with substantial fly-wheel effect and connected in the field circuit of said generator so as to control the voltage supplied to said motor.

10. A motor control system comprising a variable voltage source, a plurality of motors supplied from said source, a booster generator having its armature connected in circuit with the armature of one of said motors, means for supplying a voltage varying with the speed of the other of said motors, a dynamo-electric machine supplied from said supply means and having substantial fly-wheel effect and connections from the armature of said machine to the field circuit of said generator so that said generator controls said motor in accordance with variations in the current of said machine.

11. A system of motor control comprising a plurality of driving motors, a regulator having an element responsive to the current of one of said motors for maintaining the current input to said motor substantially constant, means responsive to rate of change of speed of the other of said motors for controlling the action of said regulator comprising a coil on said regulator for modifying the action of said current responsive element, an auxiliary motor energized in accordance with the speed of said other motor, the armature of said auxiliary motor being connected to said coil and designed to have fly-wheel effect, and a booster generator having its armature connected to said regulated motor and its field winding included in circuit with said coil and said auxiliary motor.

12. A control system for apparatus having an element operating on a strip of material and a take-up reel for the delivered strip comprising a motor for driving said element, a motor for driving said reel, means for holding substantially constant tension in the strip comprising a regulator having an operating element responsive to the current of said reel motor for maintaining substantially constant current input to said motor, means for varying the setting of said regulator to maintain the strip tension substantially constant during adjustments in the speeds of said motors comprising an auxiliary motor energized in accordance with the speed of said element driving motor and designed with fly-wheel effect so as to draw a current varying with the change in speed of said element driving motor and a coil on said regulator for varying the action of said current responsive element connected in circuit with said auxiliary motor, and means for introducing a voltage in the reel motor circuit varying with the change in speed of said element driving motor.

13. A control system for apparatus having an element operating on a strip of material and a reel for the strip comprising a motor for driving said element, a motor connected to said reel, regulating means for said reel motor for maintaining the tension of said strip substantially constant, and means for modifying the operation of said regulating means substantially in proportion to rate of change of speed of said element driving motor.

14. A control system for apparatus operating on a strip of material and a reel for the strip comprising a motor for driving said element, a motor connected to said reel, a current regulator for said reel motor for maintaining the tension of said strip substantially constant, and means for varying the current setting of said regulator substantially in proportion to the acceleration and deceleration of said element driving motor.

15. A control system for apparatus having an element operating on a strip of material and a reel for the strip, comprising a motor for driving said element, a motor connected to said reel, a regulator for controlling the operation of said reel motor, and control means for said regulator comprising a dynamo electric machine controlled in accordance with an operating condition of said element driving motor and an electroresponsive device connected in circuit with said dynamo electric machine for modifying the operation of said regulator.

16. A control system for apparatus having an element operating on a strip of material and a reel for the delivered strip comprising a motor for driving said element, a second motor for driving said reel, a regulator for maintaining the current input to said reel motor substantially constant, and means for varying the value of current to be held by said regulator comprising a dynamo electric machine responsive to the rate of change of speed of said element driving motor and an electroresponsive device connected in circuit with said machine for modifying the action of said regulator.

17. A control system for apparatus having an element operating on a strip of material and a reel for the strip comprising a motor for driving said element, a motor connected to said reel, a constant current regulator for said reel motor provided with a current responsive element, and means responsive to rate of change of speed of said element driving motor for varying the current setting of said regulator to maintain the strip tension substantially constant during speed changes comprising a dynamo electric machine equipped with an energy storing device, means for supplying a voltage to said machine proportional to the speed of said element driving motor, and a coil included in circuit with said dynamo electric machine for changing the action of said current responsive element.

18. A control system for apparatus having an element operating on a strip of material and a reel for the strip comprising a motor for driving said reel, a motor for driving said element, a constant current regulator for said reel motor provided with an operating coil responsive to the reel motor current, and means for varying the current setting of said regulator in accordance with the acceleration of said element driving motor so as to maintain the strip tension substantially constant during speed changes comprising a pilot generator driven by said element driving motor, an auxiliary motor supplied from said generator and equipped with an energy storing fly-wheel, and a coil included in circuit with said auxiliary motor for varying the action of said operating coil.

19. A control system for mill apparatus and the like having motor driven rolls for operating on the strip and a reel for the strip, comprising a motor connected to said reel, a regulator provided with a coil responsive to the reel motor current for maintaining the reel motor current substantially constant, a rheostat included in the circuit of said coil for setting said regulator to hold a desired value of motor current, means responsive to acceleration of said mill motor for varying the setting of said regulator during acceleration of the motors comprising a dynamo electric machine influenced by acceleration of the mill motor and an auxiliary coil included in the circuit of said machine for modifying the action of said current responsive coil, and a rheostat for controlling the excitation of said auxiliary coil to compensate for changes in the effect of said regulator setting rheostat during acceleration.

20. A control system for apparatus having an element operating on a strip of material and a reel for the strip comprising a motor for driving the reel, a motor connected to said element, a regulator provided with an operating coil responsive to the reel motor current for maintaining substantially constant current input to the reel motor, and means responsive to acceleration of said element driving motor for varying the setting of said regulator to maintain the strip tension substantially constant during acceleration and deceleration comprising an auxiliary coil on said regulator connected across the armature of said element driving motor for varying the effect of said operating coil, and an auxiliary motor connected in the circuit of said auxiliary coil and provided with fly-wheel effect to provide for increasing the current in said auxiliary coil during acceleration and reduction of the current in said auxiliary coil during deceleration.

21. A motor control system comprising a plurality of motors connected to a common load body, a regulator for maintaining the current input to one of said motors substantially constant, and means responsive to the rate of change of speed of the other of said motors for varying the setting of said regulator.

22. A control system for apparatus for winding and reeling a length of material having a reel for said material comprising a first dynamo electric machine mechanically connected to said reel, a second dynamo electric machine mechanically connected to the material, at a point removed from said reel, a regulator for controlling said first machine to maintain the tension in the material substantially constant, and means responsive to the acceleration of said second machine for varying the setting of said regulator.

23. A control system comprising a plurality of dynamo electric machines connected to a strip of material, a regulator for maintaining the current flow in one of said machines substantially constant, and means responsive to the rate of change of speed of another of said machines for varying the setting of said regulator.

24. A control system for apparatus for winding and reeling a length of material having a reel for said material comprising in combination a first dynamo electric machine mechanically connected to said reel for tensioning the material, a second dynamo electric machine mechanically connected to the material, a regulator for controlling said first machine to maintain said tension substantially constant, and means responsive to the rate of change of speed of said second machine for varying the setting of said regulator to control said first machine to maintain said tension substantially constant during acceleratio n and deceleration of said second machine.

25. A control system for apparatus for winding and reeling a length of material having a reel and means for drawing said material from said reel, a first dynamo electric machine mechanically connected to said reel for tensioning said material, a second dynamo electric machine mechanically connected to said drawing means, a regulator for controlling the excitation of said first machine to maintain said tension substantially constant, said regulator having a winding responsive to the armature current of said first machine, and a second winding, and means responsive to the rate of change of speed of said second machine for controlling the energization of said second winding thereby to vary the setting of said regulator so as to control said first machine to maintain said tension substantially constant during acceleration and deceleration of said second machine.

LEONID A. UMANSKY.

May 4, 1937. H. K. WATSON Re. 20,354

FUSE CONSTRUCTION

Original Filed Oct. 6, 1932 2 Sheets-Sheet 1

Inventors

Hiram K. Watson

By

Arthur R. Wroefock Attorney